UNITED STATES PATENT OFFICE 2,540,493

PROCESS FOR PRODUCING ALUMINUM FLUORIDE

Armand Schnorf, Lausanne, and Jürg Nabholz and Bruno Sguaitamatti, Muttenz, Switzerland, assignors to Aluminum Company of America, Pittsburgh, Pa., a corporation of Pennsylvania No Drawing. Application October 14, 1947, Serial No. 779,840. In Switzerland October 16, 1946

5 Claims. (Cl. 23—88)

The process used heretofore in producing aluminum fluoride consists in neutralizing aluminum hydroxide with hydrofluoric acid. However, the operation with hydrofluoric acid is undesirable, since it is very disagreeable to use.

The present invention makes it possible to produce aluminum fluoride without the use of hydrofluoric acid. A solution of hydrofluoboric acid (HBF$_4$) is decomposed with aluminum hydroxide (Al(OH)$_3$) and the resulting precipitate of hydrous aluminum fluoride then separated out, dried, and in some cases heated to rather high temperatures to expel all the water. The reaction of the decomposition and precipitation reads as follows:

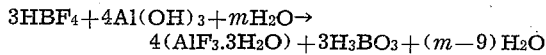

$$3HBF_4 + 4Al(OH)_3 + mH_2O \rightarrow 4(AlF_3.3H_2O) + 3H_3BO_3 + (m-9)H_2O$$

In order that the reaction may proceed faster it is best to work in the presence of heat, in fact at temperatures between 60° C. and the boiling point of the solution, preferably at about 75° C. Then we also obtain a precipitate of aluminum fluoride which is readily separated out by filtration, and the simultaneous precipitation of boric acid is avoided.

It was observed that it is highly advantageous to add hydrous aluminum fluoride in amounts of 5 to 10 grams per liter directly after adding the aluminum hydroxide. The fluoride acts as seed and promotes precipitation. The reaction mass is then stirred for approximately 16–30 hours, an average of 24 hours, the aluminum fluoride precipitating in a nicely crystalized form.

After that the precipitate is washed, dried at temperatures between room temperature and 100° C., and generally heated to 300–500° C., preferably to 350–450° C., to expel the rest of the water.

The present invention makes it possible to produce very pure aluminum fluoride. It is particularly advantageous to start with hydrofluoboric acid which contains no sodium ions. For example, if the hydrofluoboric acid containing sodium sulfate, which is produced by a known method, is neutralized with aluminum hydroxide, we always obtain a sodium fluoaluminate, because a substantial part of the sodium of Na$_2$SO$_4$ participates in the precipitation. In many cases this sodium content is undesirable.

Example

To 820 liters of an hydrofluoboric acid solution with a fluorine content of 62.6 kg., which contained practically no Na$^+$ or SO$_4^=$ ions, the stoichiometric amount of aluminum hydroxide was added in portions over a period of about ½ hour at a temperature of 70° C., in a stirring vessel. Finally, 4.1 kg. of hydrous aluminum fluoride (AlF$_3$.aq) were added as seed (corresponding to a concentration of 5 grams per liter). The temperature rose to about 80° C. Then the solution was stirred at 75° C., an immersion heater being introduced from time to time to maintain the temperature constant. After 24 hours the reaction mass was pumped out and filtered with a suction filter. The cake of AlF$_3$.aq was washed in 120 liters of water. After repeating the filtration the precipitate was washed twice in the filtering vessel, using 80 liters of water for each wash. Thereupon the moist AlF$_3$.aq was dried in the air and then heated to a temperature of about 400° C. to completely expel the water.

The resulting pure aluminum fluoride can be used very well in the electrolysis of aluminum or in the electrolytic refining of aluminum.

We claim:

1. The process of treating a solution of hydrofluoboric acid with aluminum hydroxide in such proportion that aluminum fluoride is precipitated and a solution of boric acid is formed, the said hydrofluoboric acid solution being free of such amounts of sodium and sulfate ions as to preclude such precipitation of aluminum fluoride, and separating said precipitate from said boric acid solution.

2. A process according to claim 1 in which the treatment is carried out at a temperature between 60° C. and the boiling point of the hydrofluoboric acid solution.

3. A process according to claim 1 in which hydrous aluminum fluoride is also added to the said hydrofluoboric acid solution.

4. The process of treating a solution of hydrofluoboric acid with aluminum hydroxide in such proportion that hydrous aluminum fluoride is precipitated and a solution of boric acid is formed, the said hydrofluoboric acid solution being free of such amounts of sodium and sulfate ions as to preclude such precipitation of hydrous aluminum fluoride, separating said precipitate from said boric acid solution, and thereafter expelling water from said precipitate by heating it at a temperature of at least 300° C.

5. The process of treating a solution of hydrofluoboric acid solution with aluminum hydroxide in the absence of sodium and sulfate ions in such proportion that aluminum fluoride is precipitated and a solution of boric acid is formed, and separating said precipitate from said boric acid solution.

ARMAND SCHNORF.
JÜRG NABHOLZ.
BRUNO SGUAITAMATTI.

REFERENCES CITED

The following references are of record in the file of this patent:

UNITED STATES PATENTS

| Number | Name | Date |
|---|---|---|
| 1,851,475 | Zimmermann | Mar. 29, 1932 |
| 2,182,510 | Heiser | Dec. 5, 1939 |